United States Patent
Huang

(10) Patent No.: US 7,274,182 B2
(45) Date of Patent: Sep. 25, 2007

(54) SPRING MODULATION WITH FAST LOAD-TRANSIENT RESPONSE FOR A VOLTAGE REGULATOR

(75) Inventor: Kent Huang, Taoyuan (TW)

(73) Assignee: Richtek Technology Corp., Hsinchu (TW)

( * ) Notice: Subject to any disclaimer, the term of this patent is extended or adjusted under 35 U.S.C. 154(b) by 0 days.

(21) Appl. No.: 11/211,664

(22) Filed: Aug. 26, 2005

(65) Prior Publication Data
US 2006/0043952 A1   Mar. 2, 2006

(30) Foreign Application Priority Data
Aug. 27, 2004   (TW) .............................. 93125963 A

(51) Int. Cl.
G05F 1/565   (2006.01)
G05F 1/575   (2006.01)

(52) U.S. Cl. ..................................... 323/284
(58) Field of Classification Search ................ 323/224, 323/271, 282, 284, 285, 351
See application file for complete search history.

(56) References Cited

U.S. PATENT DOCUMENTS

| | | | |
|---|---|---|---|
| 5,481,178 A * | 1/1996 | Wilcox et al. ............... | 323/287 |
| 6,064,187 A * | 5/2000 | Redl et al. .................. | 323/285 |
| 6,518,738 B1* | 2/2003 | Wang ......................... | 323/284 |
| 6,791,306 B2* | 9/2004 | Walters et al. .............. | 323/288 |
| 6,958,594 B2* | 10/2005 | Redl et al. .................. | 323/282 |
| 7,109,689 B2* | 9/2006 | Schneider ................... | 323/272 |
| 7,170,273 B2* | 1/2007 | Sase et al. .................. | 323/285 |

FOREIGN PATENT DOCUMENTS

| | | |
|---|---|---|
| TW | 595074 | 6/2004 |
| TW | 595075 | 6/2004 |

\* cited by examiner

Primary Examiner—Gary L Laxton
(74) Attorney, Agent, or Firm—Rosenberg, Klein & Lee

(57) ABSTRACT

A spring modulation is proposed to regulate the output voltage of a voltage regulator. The spring modulation comprises a differential amplifier to generate a pair of voltage signal and current signal varied with the difference between a reference signal and a feedback signal related to the output voltage, and a PWM generator to generate a PWM signal in response to the pair of voltage signal and current signal to regulate the output voltage, in such a manner that, in load transient, the greater the difference between the feedback signal and reference signal is, the greater the on-time duty-cycle of the PWM signal is.

3 Claims, 6 Drawing Sheets

US 7,274,182 B2

SPRING MODULATION WITH FAST LOAD-TRANSIENT RESPONSE FOR A VOLTAGE REGULATOR

FIELD OF THE INVENTION

The present invention is related generally to a voltage regulator and more particularly to a spring modulation for a voltage regulator.

BACKGROUND OF THE INVENTION

Voltage regulator has been applied in various electronic products to provide stable supply voltages for load on the voltage regulator. FIG. 1 schematically shows a typical voltage regulator 10 operated with constant on-time duty-cycle, which comprises a pair of high side MOS transistor 12 and low side MOS transistor 14 coupled between input voltage $V_{IN}$ and ground GND, inductor 18 coupled between the phase node 16 between the MOS transistors 12 and 14 and output $V_{OUT}$ of the voltage regulator 10, output capacitor $C_{OUT}$ coupled between the output $V_{OUT}$ and ground GND and having equivalent series resistance (ESR) $R_{ESR}$, resistors $R_1$ and $R_2$ coupled in series between the output $V_{OUT}$ and ground GND to divide the output voltage $V_{OUT}$ to generate feedback signal $V_{FB}$, error amplifier 20 to compare the feedback signal $V_{FB}$ with reference voltage $V_{REF}$ to generate error signal PM for constant on-time circuit 22 to generate a pulse width modulation (PWM) signal PWM accordingly, to switch the MOS transistors 12 and 14 by driver 24 to thereby produce an output current $I_{OUT}$ flowing through the inductor 18 to charge the output capacitor $C_{OUT}$ to produce the output voltage $V_{OUT}$ supplied to load 26.

In the voltage regulator 10, the PWM signal has a constant on-time duty-cycle. However, the switching frequency of the PWM signal is variable. FIG. 2 shows waveforms of the output voltage $V_{OUT}$ and PWM signal in the voltage regulator 10, in which waveform 50 represents the output voltage $V_{OUT}$ and waveform 52 represents the PWM signal. As shown at time T in FIG. 2, when the load 26 changes from light to heavy, the output voltage $V_{OUT}$ drops down instantly, causing a greater difference between the feedback signal $V_{FB}$ and reference voltage $V_{REF}$, which reflects on the error signal PM, having the constant on-time circuit 22 to increase the switching frequency of the PWM signal. As a result, the high side MOS transistor 12 turns on more frequently, and thereby the output voltage $V_{OUT}$ recovers back to the original level gradually.

In response to load transient, it is the switching frequency, but not the on-time duty-cycle, of the PWM signal being varied in the voltage regulator 10, and this constant on-time duty-cycle operation is easily to cause the output voltage $V_{OUT}$ to overshoot, as shown by the dotted curve 54 in FIG. 2. Therefore, the system becomes not stable, and the output capacitor $C_{OUT}$ is required to have larger capacitance, resulting in higher cost and poor conversion efficiency.

SUMMARY OF THE INVENTION

The present invention is directed to a spring modulation for a voltage regulator.

More particularly, the present invention is directed to a modulation with fast load-transient response for a voltage regulator.

In a spring modulation for a voltage regulator, according to the present invention, a differential amplifier generates a pair of voltage signal and current signal varied with the difference between a reference signal and a feedback signal related to the output voltage of the voltage regulator, and a PWM generator generates a PWM signal in response to the pair of voltage signal and current signal to regulate the output voltage. In load transient, the greater the difference between the feedback signal and reference signal is, the greater the on-time duty-cycle of the PWM signal is. Therefore, as the feedback signal approaches to the reference signal, the on-time duty-cycle of the PWM signal decreases gradually.

By using the spring modulation according to the present invention for modulating the on-time duty-cycle of a voltage regulator, fast load-transient response is achieved, the output capacitors and thereby the cost therefor could be decreased, the output voltage of the voltage regulator will not overshoot even the load-transient response is fast, and the efficiency of the voltage regulator increases.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 3:
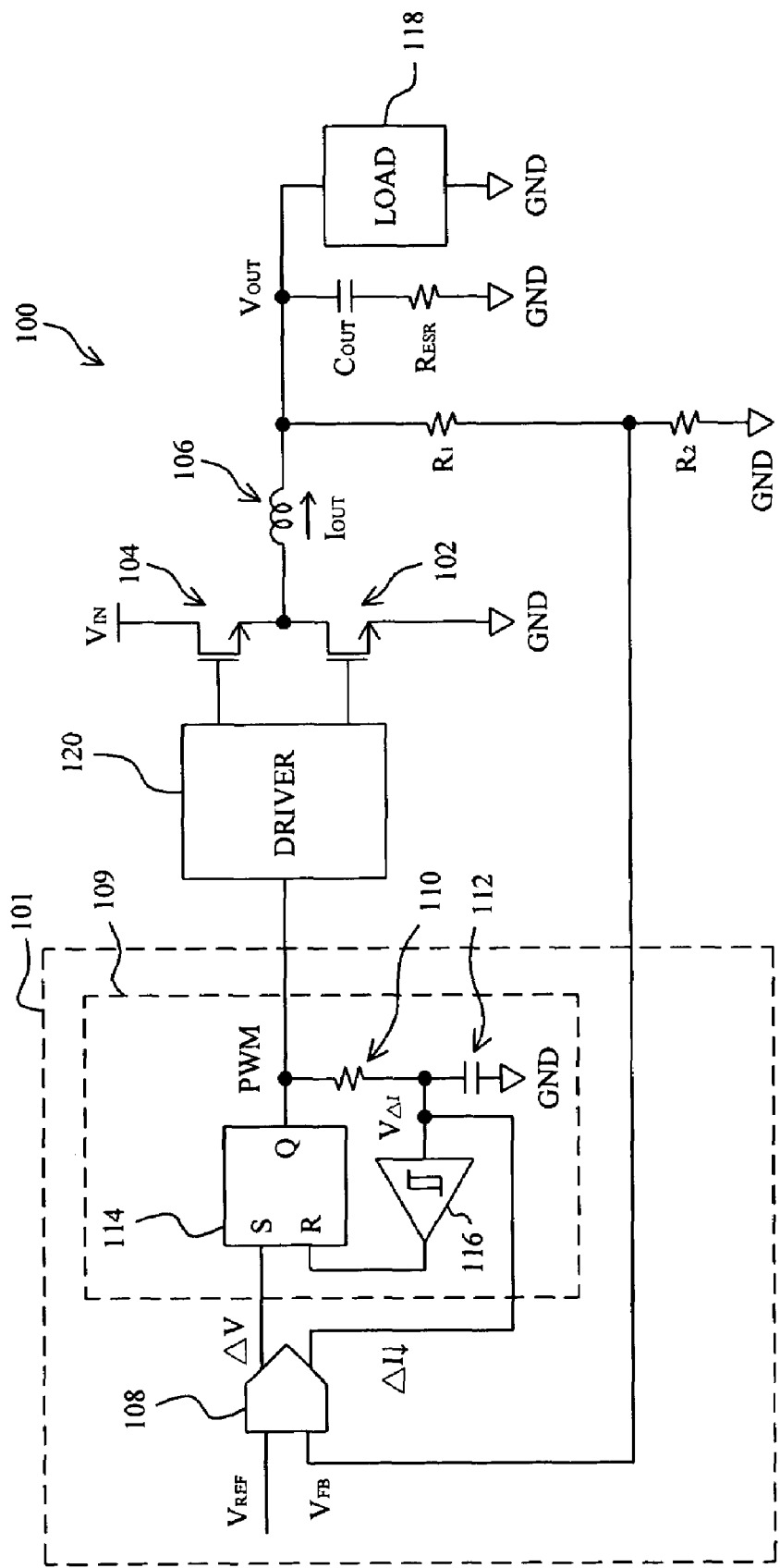
FIG. 3 shows a voltage regulator employing a spring modulation according to the present invention.

FIG. 3 shows a voltage regulator 100 employing a spring modulation according to the present invention. In the voltage regulator 100, low side MOS transistor 102 and high side MOS transistor 104 are coupled in series between input voltage $V_{IN}$ and ground GND, spring modulation circuit 101 switches the MOS transistors 102 and 104 with driver 120 to produce output current $I_{OUT}$ flowing through inductor 106 to charge output capacitor $C_{OUT}$ to produce output voltage $V_{OUT}$ supplied to load 118, the output capacitor $C_{OUT}$ has an equivalent series resistance $R_{ESR}$, resistors $R_1$ and $R_2$ are coupled in series between the output $V_{OUT}$ and ground GND to divide the output voltage $V_{OUT}$ to produce feedback signal $V_{FB}$, differential amplifier 108 generates differential voltage $\Delta V$ and differential current $\Delta I$ from the difference between the feedback signal $V_{FB}$ and reference signal $V_{REF}$, the differential voltage $\Delta V$ is coupled to the set input S of RS latch 114 in PWM generator 109, the differential current $\Delta I$ is coupled to the input of hysteretic comparator 116 in the PWM generator 109, the PWM generator 109 further comprises resistor 110 and capacitor 112 coupled in series between the output Q of the SR latch 114 and ground GND, the node between the resistor 110 and capacitor 112 has voltage $V_{AI}$ thereon and is coupled to the input of the hysteretic comparator 116, the output of the hysteretic comparator 116 is coupled to the reset input R of the RS latch 114, and the output Q of the SR latch 114 generates PWM signal for the driver 120 to switch the MOS transistors 102 and 104. The on-time duty-cycle of the PWM signal varies with the difference between the feedback signal $V_{FB}$ and reference signal $V_{REF}$. In particular, the greater the difference is, the greater the on-time duty-cycle is, and vice versa. The spring modulation circuit 101 functions like a spring connected between the desired level and real level of the output voltage $V_{OUT}$ to maintain the voltage regulator 100 producing stable output voltage $V_{OUT}$ by modulating the on-time duty-cycle of the PWM signal in response to the difference between the desired level and real level of the output voltage $V_{OUT}$.

Figure 4:
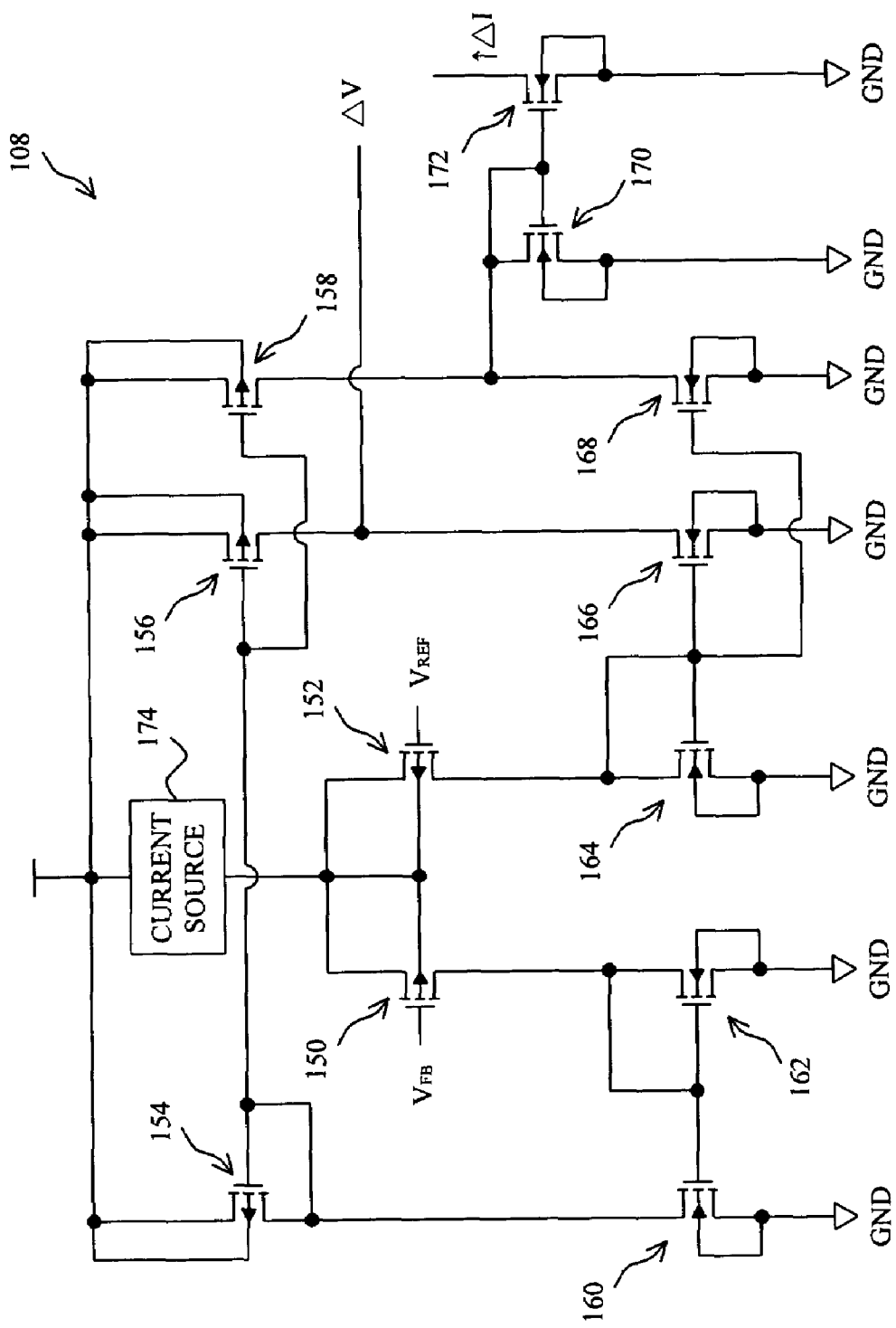
FIG. 4 shows an embodiment for the differential amplifier of the voltage regulator shown in FIG. 3.

FIG. 4 shows an embodiment for the differential amplifier 108 of the voltage regulator 100, which comprises PMOS transistors 150, 152, 154, 156 and 158, NMOS transistors 160, 162, 164, 166, 168, 170 and 172, and current source 174. The PMOS transistors 150 and 152 constitute a differential input pair to be coupled with the feedback signal $V_{FB}$ and reference signal $V_{REF}$, the current source 174 provides bias current, the MOS transistors 154, 156, 160, 162, 164 and 166 form a buffer stage, and the differential voltage $\Delta V$ is derived from the drain of the PMOS transistor 156. The MOS transistors 154, 158, 160, 162, 164 and 168 form another buffer stage, and the differential current $\Delta I$ is generated by the current mirror composed of the NOMS transistors 170 and 172. The outputs $\Delta V$ and $\Delta I$ of this differential amplifier 108 are both proportional to the difference between the feedback signal $V_{FB}$ and reference signal $V_{REF}$.

Figure 1:
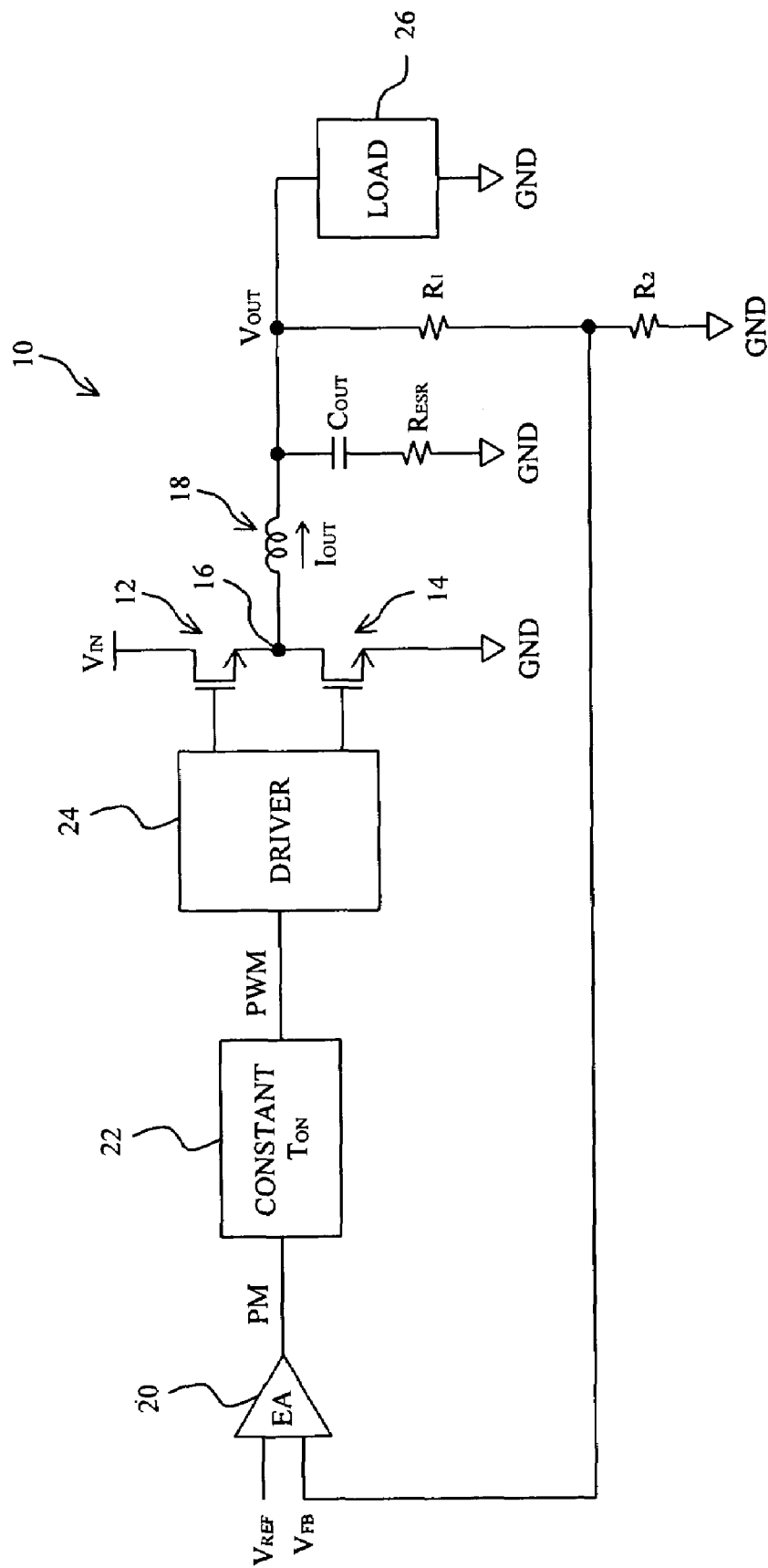
FIG. 1 schematically shows a conventional voltage regulator using constant on-time duty-cycle.
Figure 2:
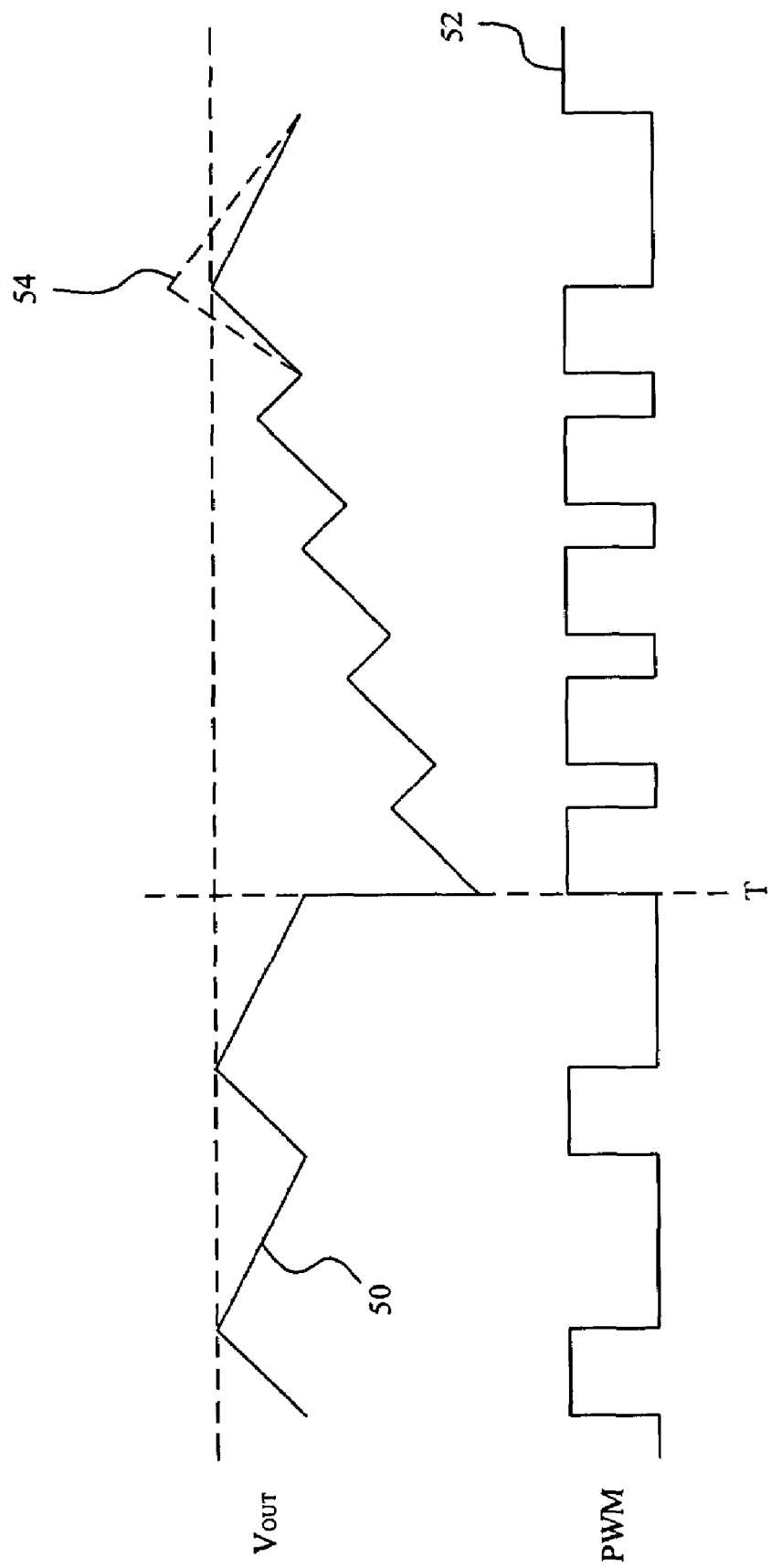
FIG. 2 depicts waveforms of the output voltage $V_{OUT}$ and PWM signal in the voltage regulator shown in FIG. 1.
Figure 5:
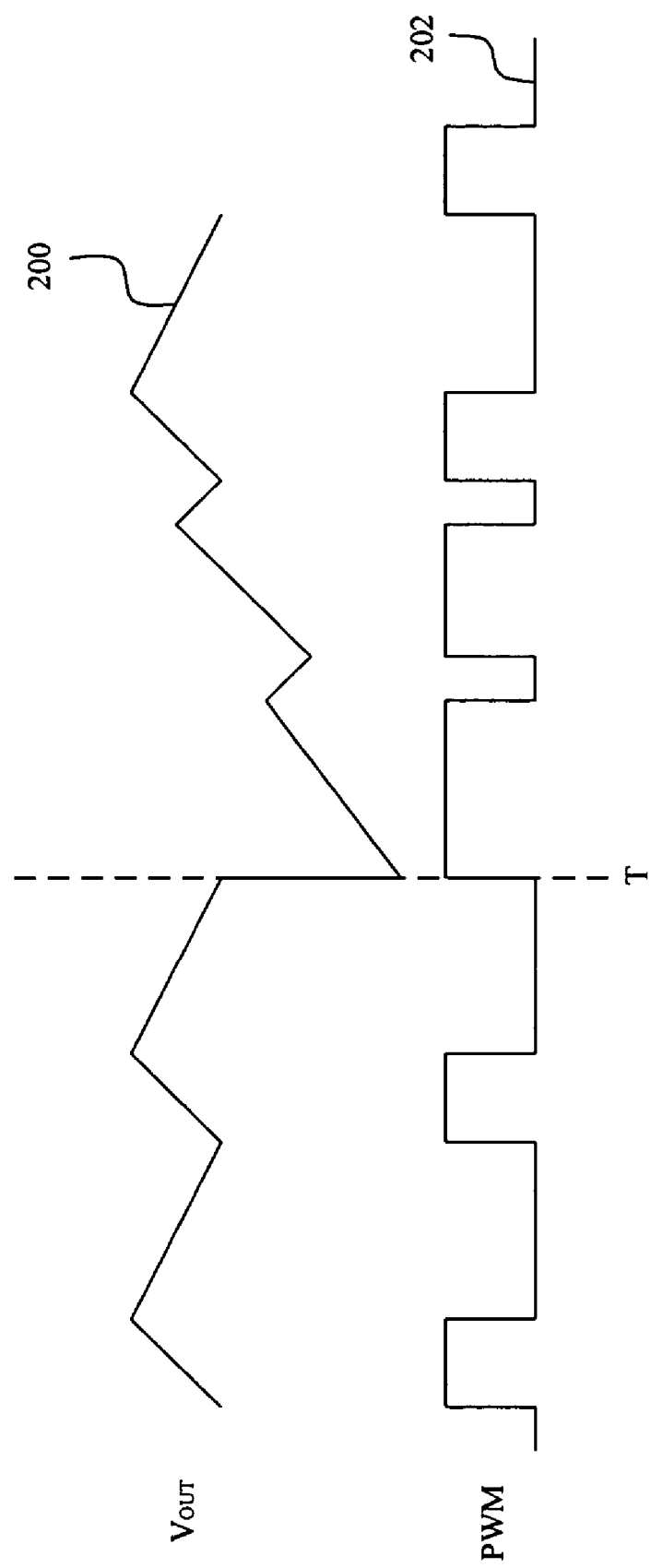
FIG. 5 depicts waveforms of the output voltage $V_{OUT}$ and PWM signal in the voltage regulator shown in FIG. 3.
Figure 6:
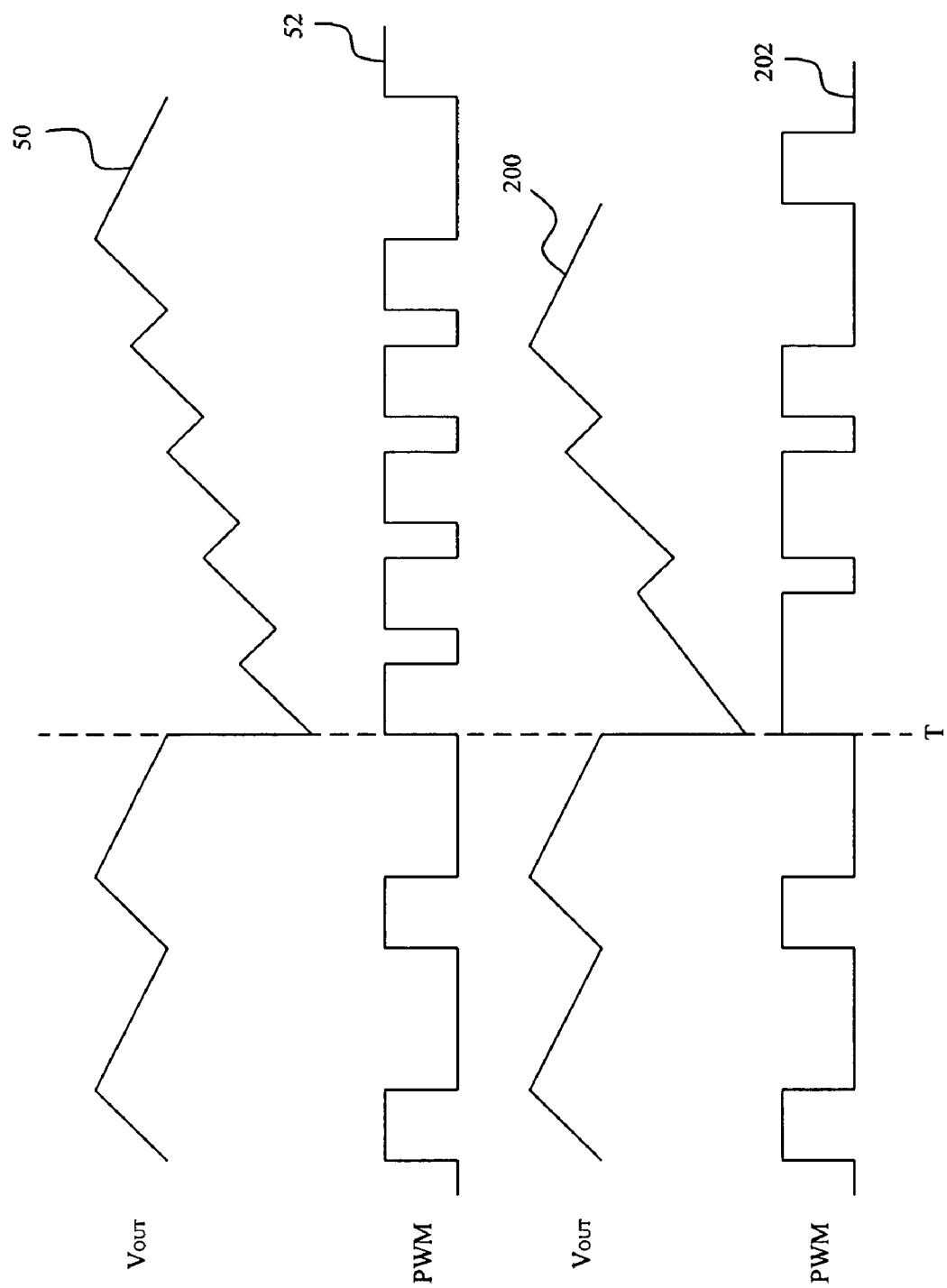
FIG. 6 is a comparison of the waveforms shown in FIGS. 2 and 5.

FIG. 5 depicts waveforms of the output voltage $V_{OUT}$ and PWM signal in the voltage regulator 100, in which waveform 200 represents the output voltage $V_{OUT}$ and waveform 202 represents the PWM signal. Referring to FIGS. 3 and 5, when the load 118 changes from light to heavy, the output voltage $V_{OUT}$ drops down instantly, and the feedback signal $V_{FB}$ also drops down since it is proportional to the output voltage $V_{OUT}$, resulting in greater difference between the feedback signal $V_{FB}$ and reference signal $V_{REF}$. Therefore, the differential amplifier produces greater differential voltage $\Delta V$ and differential current $\Delta I$, such that the on-time duty-cycle of the PWM signal increases eventually. As the output voltage $V_{OUT}$ increases, the difference between the signals $V_{FB}$ and $V_{REF}$ decreases gradually, and the on-time duty-cycle of the PWM signal decreases accordingly. Until the output voltage $V_{OUT}$ recovers back to the original level, the on-time duty-cycle of the PWM signal recovers to its original value. In load transient, the waveform 202 of the PWM signal behaves like a recovering spring. For comparison, the waveforms of FIGS. 2 and 5 are shown together in FIG. 6. When load transient occurs at time T, the voltage regulator 100 employing the spring modulation according to the present invention responds more quickly to recover the output voltage $V_{OUT}$ thereof by increasing the on-time duty cycle, while the conventional voltage regulator 10 using constant on-time duty cycle takes longer time period.

In this embodiment, the difference between the feedback signal $V_{FB}$ and reference signal $V_{REF}$ is used for modulating the on-time duty-cycle of the PWM signal, and therefore the on-time duty-cycle of the PWM signal decreases gradually in load transient, and thereby the output voltage $V_{OUT}$ will not overshoot. Since the spring modulation according to the present invention has fast load-transient response, the output capacitor is allowed to have smaller capacitance, and thus the efficiency of the voltage regulator is improved. Further, for the manufacture of the voltage regulator, the number of the output capacitor is reduced owing to the smaller capacitance required, and thus the cost of the voltage regulator is lower.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. For a voltage regulator modulated by a PWM signal of an on-time duty-cycle to produce an output voltage, a spring modulation method comprising the steps of:
   modulating the on-time duty-cycle in response to a difference between a reference signal and a feedback signal varied with the output voltage, the on-time duty-cycle gradually being decreased in response to a load transient, the step of modulating including:
   (a) generating a voltage signal at one output and a current signal at another output in response to the difference between the reference signal and the feedback signal; and
   (b) modulating the on-time duty-cycle responsive to the voltage signal and the current signal coupled through a hysteretic comparator.

2. For a voltage regulator modulated by a PWM signal of an on-time duty-cycle to produce an output voltage, a spring modulation circuit comprising:
   an apparatus for modulating the on-time duty-cycle in response to a difference between a reference signal and a feedback signal varied with the output voltage, the on-time duty-cycle being gradually decreased in response to a load transient, the apparatus including:
   (a) a differential amplifier receiving the feedback signal and reference signal for generating a voltage signal at a first output thereof and a current signal at a second output thereof varied with the difference between the reference signal and the feedback signal; and
   (b) a PWM generator for generating the PWM signal in response to the voltage signal and current signal coupled through a hysteretic comparator.

3. For a voltage regulator modulated by a PWM signal of an on-time duty-cycle to produce an output voltage, a spring modulation circuit comprising:
   an apparatus for modulating the on-time duty-cycle in response to a difference between a reference signal and a feedback signal varied with the output voltage, the apparatus including:
   a differential amplifier receiving the feedback signal and reference signal for generating a voltage signal and a current signal varied with the difference between the reference signal and the feedback signal; and
   a PWM generator for generating the PWM signal in response to the voltage signal and current signal, the PWM generator including:
   an RS latch having a set input coupled with the voltage signal;
   a hysteretic comparator having an output coupled to a reset input of the RS latch; and
   a charger coupled with the current signal for generating a charged voltage coupled to an input of the hysteretic comparator.

* * * * *